No. 740,879. PATENTED OCT. 6, 1903.
P. T. LINDHARD.
BALL GRINDING MILL.
APPLICATION FILED JAN. 3, 1902.
NO MODEL.
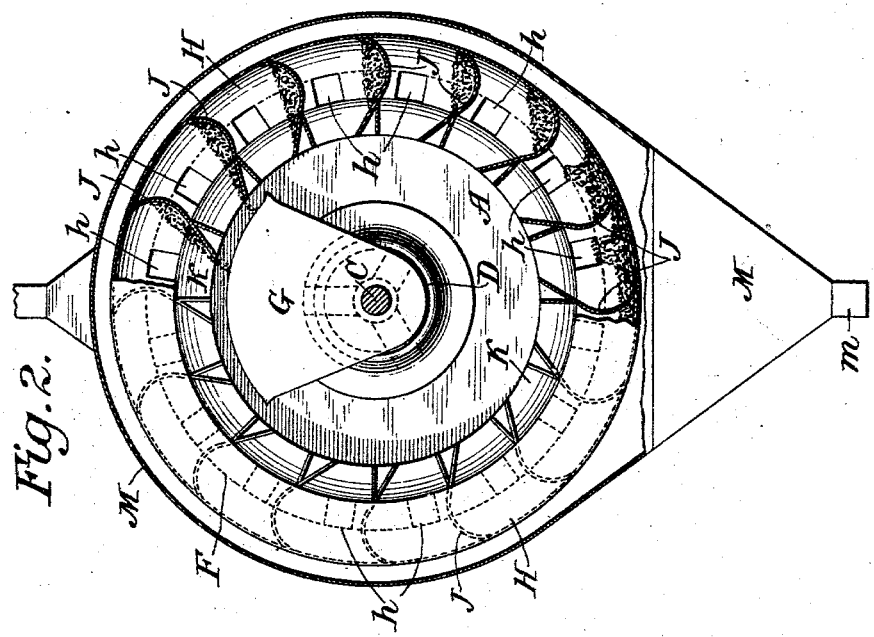
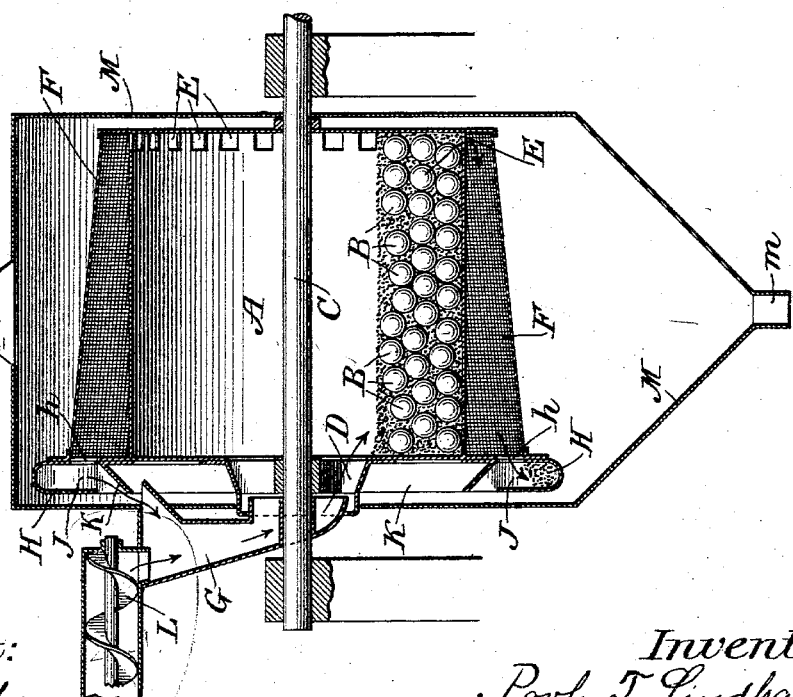
Attest:
A. N. Jesbera
Lucius E. Varney
Inventor:
Povl T. Lindhard
by Redding Kiddle Greeley
Attys.

No. 740,879. Patented October 6, 1903.

UNITED STATES PATENT OFFICE.

POVL T. LINDHARD, OF NEW YORK, N. Y., ASSIGNOR TO ALEXANDER FOSS AND POUL LARSEN, COPARTNERS DOING BUSINESS AS F. L. SMIDTH & CO., OF COPENHAGEN, DENMARK.

BALL GRINDING-MILL.

SPECIFICATION forming part of Letters Patent No. 740,879, dated October 6, 1903.

Application filed January 3, 1902. Serial No. 88,280. (No model.)

*To all whom it may concern:*

Be it known that I, POVL T. LINDHARD, a citizen of the Kingdom of Denmark, and a resident of the borough of Manhattan, city of New York, and State of New York, have invented certain new and useful Improvements in Ball Grinding-Mills, of which the following is a specification.

This invention relates to the construction of ball grinding-mills or comminuters wherein the pulverizable material is subjected to the action of grinding-balls; and it consists in the new and novel features of construction and combination of parts hereinafter set forth and described.

In the accompanying drawings, Figure 1 represents a vertical longitudinal section of a ball grinding-mill or comminuter embodying the invention. Fig. 2 represents an end elevation of the same, partly in section, to more clearly disclose the construction.

The comminuter comprises a rotatable drum A, containing grinding-balls B, mounted upon a shaft C. The drum is provided with a suitable inlet D and with discharge-openings E at or near the opposite end or head of the drum and is surrounded by a screen F, that rotates with the drum and delivers toward the inlet end thereof. The pulverizable material is supplied to the drum through a hopper G, that communicates with the inlet-opening, which is arranged as near the center of the inlet-head of the drum as possible. The inlet-head of the drum is also provided externally with a circumferential trough H, that communicates with the space between the screen and the drum by means of openings $h$. Said trough is divided into a plurality of independent sections by means of partitions J, that are curved to form scoops or buckets, whereby the material delivered to the trough is carried upward as the drum rotates. An outwardly-projecting annular flange K is also secured to the inlet-head of the drum adjacent to the trough to overlap the hopper G, by means of which the partly-ground material is returned to the interior of the drum through the inlet-opening.

The unground or fresh material is supplied to the drum through the hopper by any suitable means, as by a worm L, and after being subjected to the action of the grinding-balls the material is discharged through the openings E upon the screen F. The finely-divided material passes through the meshes of the screen and is collected by means of a pipe $m$, formed integral with or secured to the casing M, which preferably incloses the drum. The partly-ground material or tailings travels over the screen by gravity and is discharged through the openings $h$ into the trough H. It is then carried upward by the rotation of the drum and is discharged by gravity onto the projecting flange K, which acts as a chute to convey the material back into the hopper. Preferably the hopper is provided with a wide or flaring mouth, so that all of the partly-ground material may be collected from the sections of the trough while same are passing above the hopper. By means of this construction the same inlet-opening is utilized to supply the fresh material and to return the partly-ground material to the interior of the drum. Consequently the inlet-opening may be arranged at or near the axis of the drum, which permits the largest possible number of balls to be used in a drum of given diameter, since the quantity of balls is determined by the space between the outer periphery of the inlet-opening and the circumference of the drum. It is obvious that the number of sections to receive the partly-ground material may be varied to suit the different materials treated in the mill and that the shape of the hopper may be correspondingly changed, if desired.

I claim as my invention—

1. In a ball grinding-mill, a rotatable drum provided with a substantially central inlet-opening and with a plurality of peripheral discharge-openings, grinding-balls in said drum below the axis thereof, a hopper communicating with said central inlet and means to feed the fresh material to said hopper whereby the fresh material is delivered directly to the grinding-balls within the drum, a screen to receive the material discharged from the drum through the peripheral openings, and means carried by the drum to lift the material rejected by the screen and discharge the same into the top of the hopper to be delivered through the same into the drum with the fresh material substantially as described.

2. In a ball grinding-mill, a rotatable drum provided with a substantially central inlet-opening and with a plurality of peripheral discharge-openings, grinding-balls in said drum below the axis thereof, a hopper communicating with said central inlet and means to feed the fresh material to said hopper whereby the fresh material is delivered directly to the grinding-balls within the drum, a screen to receive the material discharged from the drum through the peripheral openings, and a trough carried by the drum and having on one side openings to receive the material rejected by the screen and on the other side openings and a deflector to discharge the material into the top of the hopper to be delivered through the same into the drum with the fresh material, substantially as described.

In testimony whereof I sign this application, in the presence of two witnesses, this 24th day of December, 1901.

POVL T. LINDHARD.

Witnesses:
ANTHONY N. JESBERA,
LUCIUS E. VARNEY.